United States Patent [19]

Lock

[11] Patent Number: 5,178,096

[45] Date of Patent: Jan. 12, 1993

[54] LIVESTOCK HANDLING/FEEDING APPARATUS AND METHOD

[76] Inventor: Stanley L. Lock, Rte. 3, Box 13, Hiawatha, Kans. 66434

[21] Appl. No.: 833,481

[22] Filed: Feb. 10, 1992

[51] Int. Cl.$^5$ .......................... A01K 1/00; A01K 5/00
[52] U.S. Cl. ........................ 119/58; 119/60; 119/150
[58] Field of Search ............... 119/58, 60, 148, 147.1, 119/149, 150, 904

[56] References Cited

U.S. PATENT DOCUMENTS

| | | | |
|---|---|---|---|
| 3,949,706 | 4/1976 | Coon | 119/58 |
| 4,037,566 | 7/1977 | Albers | 119/147 |
| 4,055,149 | 10/1977 | Haiges | 119/147 |
| 4,258,663 | 3/1981 | Schoessow | 119/58 |
| 4,314,528 | 2/1982 | Fogleman | 119/148 |
| 4,419,963 | 12/1983 | Willibrordus | 119/58 |
| 4,457,265 | 7/1984 | Anderson | 119/148 |
| 4,476,815 | 10/1984 | Albers, Sr. | 119/148 |
| 4,574,741 | 3/1986 | Mahler | 119/98 |
| 4,940,022 | 7/1990 | Spinder | 119/148 |

FOREIGN PATENT DOCUMENTS

| | | | |
|---|---|---|---|
| 1088388 | 10/1980 | Canada | 119/58 |
| 569531 | 2/1933 | Denmark | 119/148 |

*Primary Examiner*—John G. Weiss
*Attorney, Agent, or Firm*—Litman, McMahon & Brown

[57] ABSTRACT

An improved livestock handling apparatus and method include a frame mounted on wheels having a plurality of stanchions arranged in side-by-side relationship along sides thereof such that livestock can place their heads through the stanchions and reach feed placed in troughs and bales placed on rails spaced interiorally to the apparatus. Locking mechanisms, each comprising a pivotally mounted latch abutting an upper end of a pivotable sidebar of each of the stanchions, automatically lock such that an animal cannot pass its head into, or remove its head from, one of the stanchion. A deactivator, including an axially rotatable rod having nubs spaced therealong, interacts with the latches to deactivate the locking mechanisms such that the livestock can pass their head through and remove their head from the stanchions. A selectively openable gate at one end of the apparatus provides interior access to the apparatus.

3 Claims, 2 Drawing Sheets

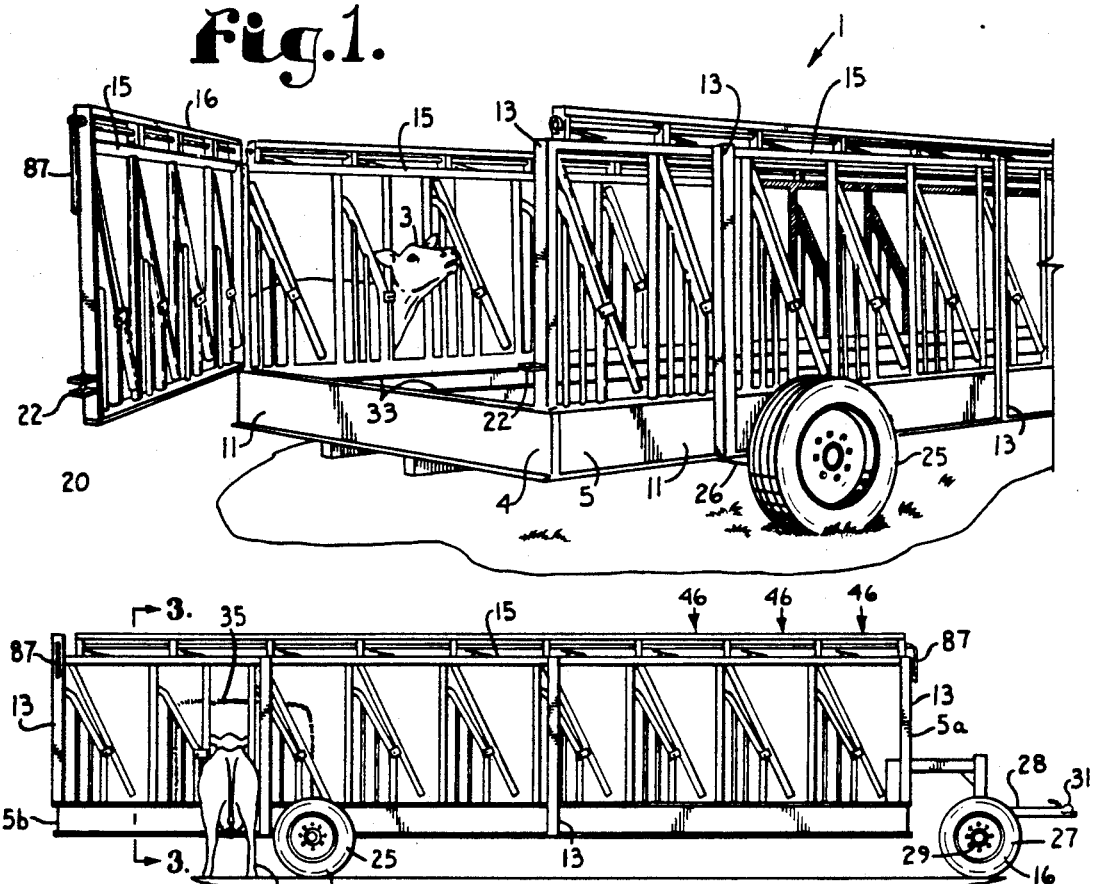
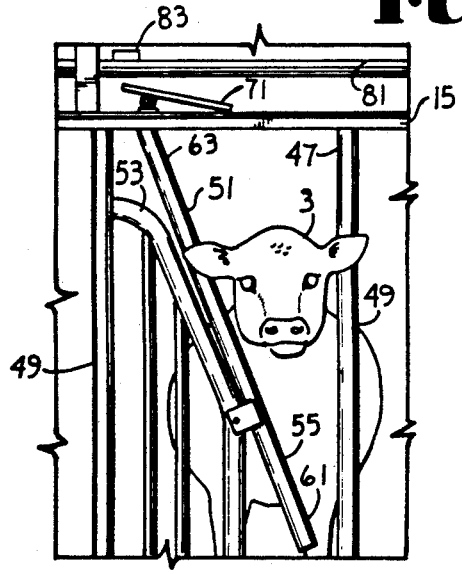
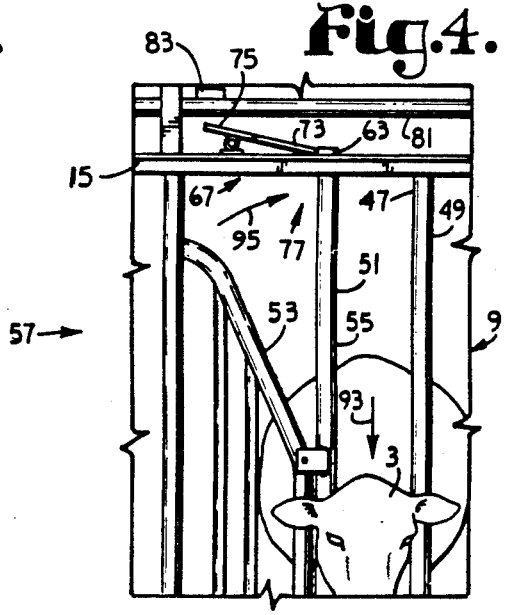

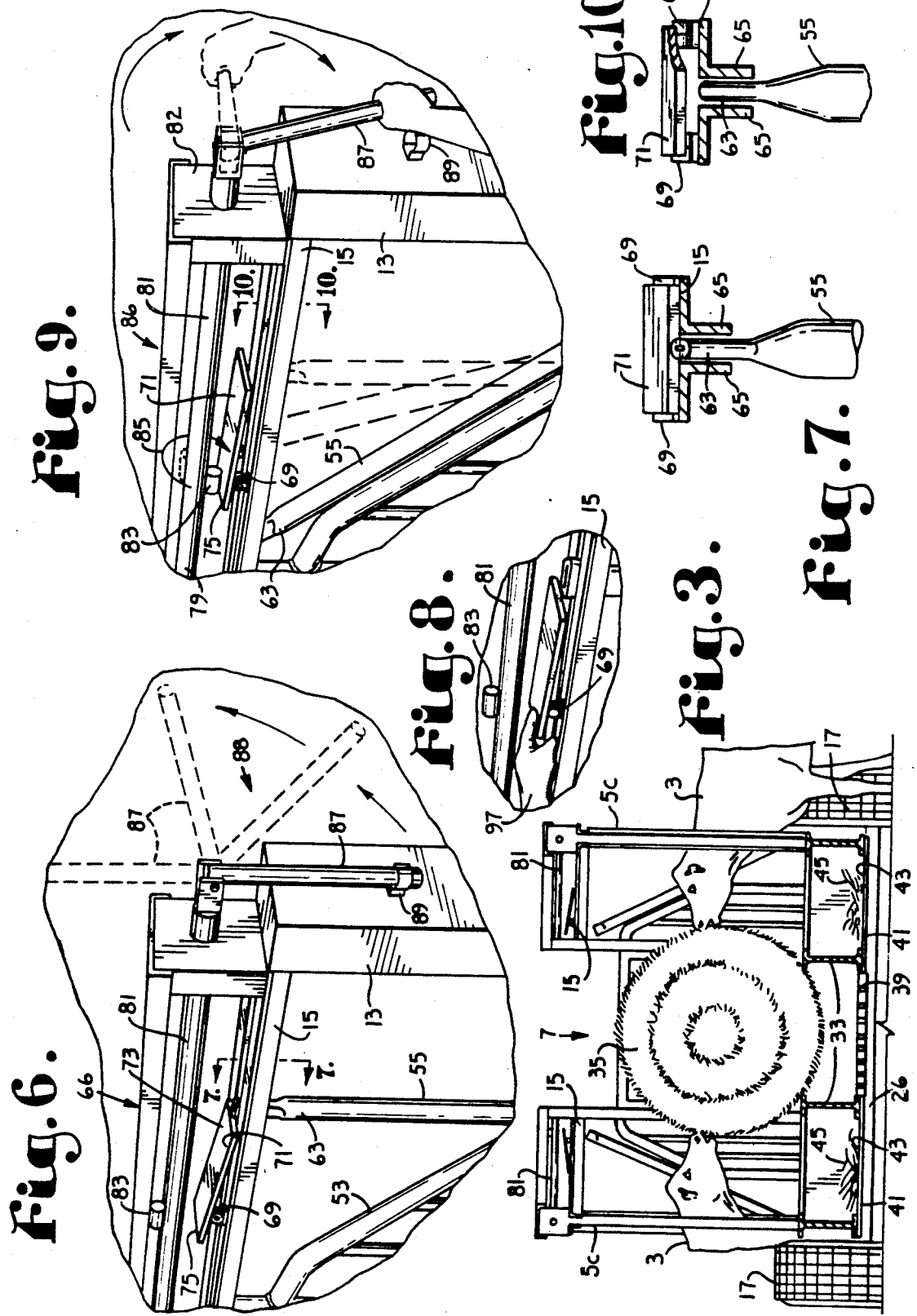

LIVESTOCK HANDLING/FEEDING APPARATUS AND METHOD

BACKGROUND OF THE INVENTION

1. Field of the Invention

The present invention relates to an apparatus and method for handling and/or feeding livestock and, in particular, to a combination apparatus and method for feeding and/or selectively immobilizing the livestock with mobile stanchions.

2. Description of the Related Art

Various types of apparatuses have been developed for handling (e.g. immobilizing livestock for various purposes, such as vaccinating, de-horning, artificial insemination, and the like). Some of those apparatuses include locking and releasing mechanisms for automatic locking and releasing livestock immobilized thereby. Unfortunately, most of such locking and releasing mechanisms operate by translational displacement of certain components thereof. As a result, such mechanisms tend to jam or require relatively frequent maintenance in order to assure continued functioning of the apparatuses as originally intended.

Some of the apparatuses of the prior art are not portable, but are installed at a fixed location. As a result, livestock must be driven or transported to the location of the apparatus which, many times, may be time-consuming, inconvenient, and cost ineffective.

Many of the apparatuses of the prior art which are portable are designed for immobilizing purposes only. As a result, the usefulness of such apparatuses is limited to only those times when used for immobilizing livestock. During the remainder of the available time, the investment therein is non-productive as the apparatus stands idle.

What is needed is an apparatus and a method whereby the apparatus can be transported to the livestock ready for immediate use; which has locking mechanisms which function substantially in such a manner, such as pivotally, whereby reliability is substantially improved and maintenance is substantially reduced or eliminated; and which can be used for alternative purposes, such as feeding large round hay bales to livestock during those periods of time when the apparatus is not needed for handling purposes.

SUMMARY OF THE INVENTION

An improved livestock handling/feeding apparatus and method are provided for feeding feed and large round hay bales to a plurality of farm animals or livestock, particularly cattle, and for immobilizing the farm animals. The apparatus includes a frame, which is rectangularly shaped, having four sides including a front end, a rear end, and a pair of opposing sides. The frame has an understructure, a plurality of uprights, and a pair of parallelly spaced apart guide rails secured near upper extremities of the uprights, generally along each of the four sides. The rear end generally includes a selectively openable gate portion, which provides interior access to the apparatus.

The apparatus is generally mounted on wheels consisting of a transverse axle having a pair of side wheels mounted thereon and a dolly-type front wheel arrangement which, in conjunction with the side wheels, provide stand-alone support for the apparatus. A tongue with a hitch is connected to the front wheel arrangement such that the apparatus can be towed.

A plurality of stanchions are arranged in generally side-by-side relationship along each of the four sides of the apparatus. Each of the stanchions includes a first sidebar, which is fixedly connected to the frame such that the first sidebar is generally vertically oriented; a pivot support, which is fixedly connected to the frame; and a second sidebar, which is pivotally connected to the pivot support. Each of the second sidebars has a sidebar upper end which is slidingly connected between the respective pair of guide rails.

Each of the stanchions has a first configuration wherein the second sidebar is generally parallel to the first sidebar and is spaced from the first sidebar such that a neck of one of the livestock can be contained between the first sidebar and the second sidebar such that the livestock cannot pass its head between the first sidebar and the second sidebar. As one of the second sidebars approaches and assumes the first configuration, the respective sidebar upper end protrudes above the respective pair of guide rails.

Each of the stanchions also has a second configuration wherein a lower end of the respective second sidebar is spaced toward the respective first sidebar and the respective sidebar upper end is spaced away from the first sidebar such that one of the livestock can pass its head between the sidebar upper end and the first sidebar.

Each of the stanchions has a latching mechanism, which includes a latch having a lock end and a release end; and a pair of hubs, each connected to a respective one of the pair of side rails such that the respective sidebar upper end of the stanchion can pass between the pair of hubs. The respective pair of hubs are connected intermediately to the respective latch such that the latch pivots about a generally horizontally oriented axis and such that the lock end thereof is gravitationally urged downwardly to abut, in close proximity to the respective sidebar upper end, upper extremities of the guide rails as the respective second sidebar assumes the first configuration.

The apparatus also includes a deactivator for each group of the stanchions which are arranged in generally side-by-side relationship. The deactivator, which has an activated configuration and a deactivated configuration, includes a rod spaced generally parallel relative to the respective guide rails, a plurality of spacers adapted to mount the rod to the frame such that the rod is axially rotatable, and a plurality of nubs secured to the rod such that the nubs are aligned generally colinearly.

As the activator assumes the activated configuration, the rod is axially rotated such that the nubs are spaced away from the respective release ends of the latching mechanism whereby the respective lock ends gravitationally abut the respective guide rails. As the deactivator assumes the deactivated configuration, the nubs are rotated toward the guide rails such that the nubs interact with the respective release ends whereby the respective sidebar upper ends can pass beneath the respective latches from the first configuration to the second configuration The apparatus includes a handle pivotally connected to each of the rods such that the handle can assume a downwardly depending configuration as the deactivator assumes the activated configuration and as the deactivator assumes the deactivated configuration. A connector is connected to the frame such that the handle can be selectively secured in the downwardly depending configuration.

The apparatus generally includes a pair of parallelly spaced apart bale rails for holding and positioning round bales for accessibility thereto by livestock which have inserted their heads into the stanchions. A trough generally extends interiorally along each side of the apparatus for holding feed for the livestock which have inserted their heads into the stanchions.

The method includes the steps of providing an apparatus as hereinbefore described, placing the deactivator in the activated configuration, placing feed interiorally to the apparatus, and placing the apparatus such that the livestock can pass their heads through the stanchions. Subsequent steps of the methods include placing the apparatus in the deactivated configuration whereby the livestock can withdraw their heads from the stanchions.

PRINCIPAL OBJECTS AND ADVANTAGES OF THE INVENTION

Therefore, the principal objects and advantages of the present invention include: providing an apparatus and a method for feeding and immobilizing livestock; providing such an apparatus and a method whereby a plurality of the livestock can be selectively, automatically immobilized; providing such an apparatus and a method whereby individual ones of the livestock immobilized therein can be selectively released; providing such an apparatus and a method whereby a plurality of the livestock immobilized therein can be selectively released; providing such an apparatus which is portable; providing such an apparatus which has a minimal number of components; and generally providing such an apparatus which is efficient and reliable, economical to manufacture, simple to maintain, and which generally performs the requirements of its intended purpose.

Other principal objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective and fragmentary view of a livestock handling/feeding apparatus, according to the present invention.

FIG. 2 is a reduced, side elevational view of the livestock handling/feeding apparatus.

FIG. 3 is an enlarged and fragmentary, cross-sectional view of the livestock handling/feeding apparatus, taken generally along line 3—3 of FIG. 2.

FIG. 4 is a further enlarged and fragmentary view of the livestock handling/feeding apparatus, showing a stanchion in a locked configuration.

FIG. 5 is a further enlarged and fragmentary view of the livestock handling/feeding apparatus, showing the stanchion in an unlocked configuration.

FIG. 6 is a further enlarged and fragmentary, perspective view of the livestock handling/feeding apparatus, showing a latch and a pivotable sidebar in a locking configuration.

FIG. 7 is a further enlarged and fragmentary, partially cross-sectional view of the livestock handling/feeding apparatus, showing the latch and the pivotable stanchion sidebar, taken generally along line 7—7 of FIG. 6.

FIG. 8 is a further enlarged and fragmentary, perspective view of the livestock handling/feeding apparatus, showing the latch being manually controlled.

FIG. 9 is a further enlarged and fragmentary, perspective view of the livestock handling/feeding apparatus, showing the latch and the pivotable stanchion sidebar in a non-locking configuration.

FIG. 10 is a still further enlarged and fragmentary, partially cross-sectional view of the livestock handling/feeding apparatus, taken generally along line 10—10 of FIG. 9, with portions cut away to reveal details thereof, according to the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a livestock handling/feeding apparatus and method for use in feeding and immobilizing livestock, such as cattle 3 in accordance with the present invention, as shown in FIGS. 1-10. The apparatus 1 comprises supporting means 4, feed holding means 7, and immobilizing means 9. The supporting means 4 has a generally rectangularly shaped frame 5, with a front end 5a, a rear end 5b, a pair of opposing sides 5c, an understructure 11 rigidly connected to a plurality of uprights 13, and top rails 15.

The rear end 5b generally comprises a gate portion 16 pivotally connected to a remaining portion 18 of the supporting means 5 about a generally vertically oriented axis. The gate portion 16 pivots from an open configuration 20, wherein the feed holding means 7 are accessible to a user, as shown in FIG. 1, to a closed configuration (not shown) wherein the feed holding means 7 are generally completely surrounded by the immobilizing means 9 and the supporting means 5. The gate portion 16 is secured in the (unshown) closed configuration by securing means 22.

The apparatus 1 is generally mounted on wheels 24, for portability, such as a pair of opposing side wheels 25 having a fixed transverse back axle 26 therebetween, by methods commonly known in the art, and one or more front wheels 27. The front wheels 21 interconnect a tongue 28 and the front end 5a of the apparatus 1, as shown in FIG. 2. The back axle 26 is generally spaced nearer to the back end 5b of the apparatus 1 than to the front end 5a of the apparatus 1.

The front wheels 27 are pivotally connected to a generally horizontally oriented front axle 29 and the front axle is generally pivotable about a generally vertically oriented axis, as designated AA in FIG. 2. The front wheels 27 are generally closely spaced together, forming a dolly-type arrangement, which is adapted to provide sufficient clearance between the front wheels 27 and the front end 5a as the apparatus 1 is being arcuately turned. The front wheels 27 and the side wheels 25 are adapted to support the apparatus 1, with feed loaded thereon, as hereinafter described, such that the apparatus 1 can be parked in a pasture, or other suitable location, in a stand-alone arrangement for feeding the livestock 3.

The tongue 28 generally includes a hitch 31 such that the apparatus 1 can be relocated by towing behind a powered vehicle, such as a pickup, a tractor, or other suitable means (not shown).

Feed holding means 7 generally include a pair of lengthwise beams or bale rails 33, which are appropriately spaced apart to support large round hay bales 35 such that the cattle 3 can easily reach the bales 35 from either of the opposing sides 5c of the apparatus 1, as shown in FIG. 3.

A first partial floor 39 between the bale rails 33 is generally comprised of expanded mesh or other suitable material such that small particles and rainwater readily fall therethrough. The first partial floor 39 is constructed sufficiently ruggedly to support one or more persons (not shown) standing and walking thereon.

The feed holding means 7 also include second partial floors 41, which form troughs 43 lengthwise adjacent to each of the opposing sides 5c, as shown in FIG. 3. The partial floors 4; are generally constructed of solid material such that feed 45 can be placed therein. The partial floors 41 are constructed sufficiently ruggedly to support one or more persons standing and walking thereon.

The immobilizing means 9 generally include a plurality of stanchions 46 arranged in generally side-by-side relationship along the front end 5a, the rear end 5b, and the sides 5c of the apparatus 1. Each of the stanchions 46 includes a first or fixed stanchion side 47, which includes a first sidebar 49 rigidly secured to the understructure 11 and to the top rails 15, as appropriate, such that the first sidebar 49 is generally vertically oriented.

The immobilizing means 9 also include a second stanchion side 51, which includes a pivot support 53 and a second or pivotable sidebar 55. The pivot support 53 is generally rigidly secured to the understructure 11 and an adjacent one of the first sidebars 49, as shown in FIG. 4. Alternatively, the pivot support 53 may be a solid panel (not shown) with appropriate edges thereof secured to the understructure 11 and an adjacent one of the first sidebars 49.

The second sidebar 55 is intermediately connected to the pivot support 53 such that the second sidebar 55 is pivotable from a first configuration, as shown in FIG. 4 and as designated by the numeral 57, to a second configuration, as shown in FIG. 5 and as designated by the numeral 59.

As the apparatus 1 is in the first configuration 57, the first sidebar 49 and the second sidebar 55 are generally parallel and are spaced apart such that the animal 3 cannot pass its head, by ingress or by egress, therebetween. As the second sidebar 55 is pivoted from the first configuration 57 to the second configuration 59, a lower end 61 of the second sidebar 55 is displaced toward the first sidebar 49 and an upper end 63 of the second sidebar 55 is displaced away from the first sidebar 49 such that the animal 3 can pass its head, by ingress and by egress, between the sidebar upper end 63 and the first sidebar 49, as shown in FIG. 5.

Each of the top rails 15 generally comprise a pair of parallelly spaced apart angles or guide rails 65, as shown in FIG. 7, such that the sidebar upper end 63 is slidingly connected to a respective one of the top rails 15 and such that the second sidebar 55 generally pivots in a plane formed by the first sidebar 49 and the second sidebar 55. The pivotal mounting of the second sidebar 55 is generally slightly unstable such that the sidebar upper end 63 generally gravitationally tends to fall away from the first sidebar 49. The sidebar upper end 63 is adapted to protrude above upper extremities of the guide rails 65 as the second sidebar 55 is displaced to the second configuration 59 as hereinafter described.

The apparatus 1 also includes locking means 66, such as a latching mechanism 67, for automatically locking each of the immobilizing means 9 as respective ones of the immobilizing means 9 assume the first configuration 57. The latching mechanism 67 generally includes a pair of opposing hubs 69, each of which is connected to an upper extremity of a respective one of the pair of guide rails 65 such that the sidebar upper end 63 can pass between the hubs 69 as the second sidebar 55 is pivoted from the second configuration 59 to the first configuration 57.

The latching mechanism 67 also includes a latch 71, which is connected to a respective pair of the hubs 69 such that the latch 71 pivots about a generally horizontal axis oriented transversely to the pair of guide rails 65 and such that the sidebar upper end 63 can pass beneath the latch 71 as the second sidebar 55 is pivoted from the second configuration 59 to the first configuration 57. The latch 71 has a latch lock end 73 and a latch release end 75. The latch 71 is connected off-center to the hubs 69 such that the latch lock end 73 is generally gravitationally urged downwardly. The latch 71 and hubs 69 are spaced such that the latch 71 assumes an activated configuration, as designated by the numeral 77 in FIG. 4, whereat the latch lock end 73 is spaced near and alongside the respective sidebar upper end 63 as the second sidebar 55 is in the first configuration 57.

The apparatus 1 also includes deactivating means, such as a deactivator 79, for selectively deactivating the locking means 66. For each of the front end 5a, the rear end 5b, and the opposing sides 5c, the deactivator 79 generally includes an elongate, generally horizontally oriented rod 81, which is connected to the guide rails 65 with spacers 82 such that the rod 81 is axially pivotable.

The deactivator means 79 also includes a plurality of nubs 83, one for each of the respective latching mechanisms 67. The nubs 83 are secured to the rod 81 such that the nubs 83 can be rotated away from the respective latch upper ends 75, allowing the respective latches 71 to assume the activated configuration 77, as shown in FIG. 6. Similarly, the nubs 83 can be rotated, as indicated by the arrow designated by the numeral 85 in FIG. 9, such that the nubs 83 interact with the respective latch upper ends 75, thereby assuming a deactivated configuration, as indicated by the numeral 86 in FIG. 9, whereby the locking means 66 is deactivated and the respective sidebar upper end 63 can readily pass uninhibitedly beneath the latch 71, as shown in FIG. 9.

A handle 87 is pivotally connected to one end of the rod 81 such that the handle 87 can assume a generally downwardly depending configuration relative to the rod 81, as indicated by the numeral 88 in FIG. 6, as the respective nubs 83 are in the activated configuration 77 and in the deactivated configuration 86. A connector 89 is secured to the supporting means 5 such that the handle 87 can be latched in the downwardly depending configuration 88.

In an application of the present invention, the securing means 22 is manipulated such that the gate portion 16 can be opened, providing access to the interior of the apparatus, as shown in FIG. 1. If the livestock 3 are to be treated from the interior of the apparatus 1, then, generally, only the feed 45 is placed in the troughs 43. However, if the livestock 3 will not be treated from the interior of the apparatus 1, the hay bales 35 may be positioned on the bale rails 33 instead of, or in addition to, placement of the feed 45 in the troughs 43. After placement of the hay bales 35 and/or the feed 45 in the apparatus 1, the gate portion 16 is closed and secured by the securing means 22. The apparatus 1 is then towed, as desired, to a location where the apparatus 1 will be readily accessible to the livestock 3.

If the livestock 3 are to have free access to the bales 35 and the feed 45, then the handle 87 is disconnected from the connector 9 and rotated such that the nubs 83 are displaced toward the respective release ends 75 of the latches 71, thereby placing the deactivator 79 in the deactivated configuration 86.

Upon observing the bales 35 and/or the feed 45 contained in the apparatus 1, the cattle 3 will attempt to attain access thereto. Because of the built-in instability of the second stanchion sides 51, some of the second stanchion sides 51 will assume the second configuration 59 whereby the livestock 3 can insert their heads between the respective sidebar upper end 63 and the respective first sidebars 49, as shown in FIG. 5. For the stanchions 46 which do not automatically assume the second configuration 59, those stanchions 46 will readily assume the second configuration 59 as the cattle 3 urge their heads against those stanchions 46 in an attempt to reach the hay bales 35 and/or the feed 45.

After inserting their heads through the stanchions 46, the cattle 3 will naturally lower their heads to reach the hay bales 35 and/or the feed 45, as indicated by the arrow designated by the numeral 93 in FIG. 4, causing the respective second stanchion side 51 to rotate and assume the first configuration 57, as indicated by the arrow designated by the numeral 95 in FIG. 4. After feeding, the cattle 3 simply elevate their heads and back away from the apparatus 1, causing the respective second stanchion sides 51 to rotate back to the second configuration 59.

If, however, it is desired to use the apparatus 1 for immobilizing the cattle 3, the handle 87 is manipulated such that the nubs 83 are rotated away from the latch release ends 75, thereby placing the latching mechanism 57 in the activated configuration 77. Then, as the cattle 3 lower their heads, as indicated by the arrows designated 93, the respective sidebar upper ends 63 pass beneath the respective latch lock ends 73. As the second stanchion sides 51 assume the first configuration 57, the respective latch lock ends 73 are gravitationally urged downward to abut the guide rails 15, whereby the sidebar upper ends 63 are prevented from passing back beneath the respective latches 71. The spacing between the first sidebars 49 and the second sidebar 55 is dimensioned to contain the necks of the livestock 3 therebetween but to prevent the withdrawal of the heads of the livestock 3 as the respective stanchions 46 assume the first configuration 57.

The spacing between the stanchions 46 in side-by-side relationship is such that ones of the livestock 3 confined between others of the livestock, adjacently disposed on both sides thereof, substantially limiting sidewise movement of body portions extending outwardly from the apparatus 1 of such intermediately disposed ones of the livestock 3. In one application of the present invention, the effective width of each of the stanchions 46 was approximately twenty-two inches.

If the livestock 3 are to be treated from the interior of the apparatus 1, then it is a simple matter for a veterinarian or others to open the gate portion 16 after the livestock 3 are immobilized by the apparatus 1, and move among the heads of the livestock 3 by walking and standing on the first partial floor 39 and/or the second partial floors 41.

In one application of the present invention, eleven of the stanchions 46 were disposed along each of the opposing sides 5c, four of the stanchions 46 were disposed along the gate portion 16, and two of the stanchions 46 were disposed along the front end 5a, for a total of twenty-eight of the stanchions 46 contained in the apparatus 1.

After treating the livestock 3, the stanchions 46 can either be simultaneously unlocked by manipulating the handle 87 such that the deactivator 79 is placed in the deactivated configuration 86, or the livestock 3 can be individually released by manually pressing downwardly on an appropriate one of the release ends 75 with a hand 97, or the like, as shown in FIG. 8. In the latter case, other ones of the livestock 3 may then become immobilized by the apparatus 1 as treatment is provided to the livestock 3 which have not been released.

When the apparatus 1 is to be used for feeding purposes only, it is a simple matter to leave the handle 87 secured in the downwardly-depending configuration 88 by the connector 89 with the deactivator 79 in the deactivated configuration 86, whereby the livestock 3 will not be inadvertently locked in the stanchions 46.

Similarly, if bales 35 and/or feed 45 have been placed in the apparatus 1, and it is desired that the livestock 3 do not have access thereto, it is a simple matter to secure the handle 87 in the downwardly-depending configuration 88 by the connector 89 with the deactivator 79 in the activated configuration 77 and each of the second sidebars 55 disposed and locked in the first configuration 57.

It is to be understood that while certain forms of the present invention have been illustrated and described herein, it is not to be limited to the specific forms or arrangement of parts described and shown.

What is claimed and desired to be secured by Letters Patent is as follows:

1. A combination feeding/immobilizing apparatus for feeding feed including large round hay bales to a plurality of farm animals and for selectively automatically immobilizing the farm animals, comprising:
(a) a frame having an understructure, a plurality of uprights, and a pair of parallelly spaced apart guide rails each comprising an angle member with a vertical flange end and a horizontal flange; said frame generally having four sides including a front end, a rear end comprising a selectively openable gate portion, and a pair of opposing sides;
(b) side wheels having an axle, which are adapted to provide mobility to said apparatus;
(c) a dolly-type front wheel arrangement having a tongue with a hitch adapted to be towed; said front wheel arrangement adapted, in conjunction with said side wheels, to provide stand alone support for said apparatus;
(d) a pair of bale rails; said bale rails parallelly spaced such that the round bales spaced thereon generally will not roll toward said opposing sides;
(e) a pair of troughs generally extending from said bale rails to said opposing sides;

(f) a plurality of stanchions arranged in side-by-side relationship along said opposite sides and said rear end, each said stanchion comprising:
  (1) a first sidebar; said first sidebar fixedly connected to said frame such that said first sidebar is generally vertically oriented;
  (2) a pivot support comprising a lower, generally vertical section and an upper section extending at an angle in a direction generally upwardly and away from said first sidebar, said pivot support including a pivot support shoulder; said pivot support fixedly connected to said frame;
  (3) a second sidebar having a sidebar upper end and a sidebar lower end; said second sidebar including a clevis-shaped mounting bracket pivotally connected to said pivot support shoulder and said upper end slidingly connected between said guide rails such that said second sidebar;
    (A) has a first configuration wherein said second sidebar is generally parallel to said first sidebar and is spaced from said first sidebar such that a neck of one of the farm animals can be contained therebetween but the farm animal cannot pass its head therebetween; said sidebar upper end protrudes above said pair of guide rails as said second sidebar approaches and assumes said first configuration;
    (B) has a second configuration wherein said lower end is spaced toward said first sidebar and said sidebar upper end is spaced away from said first sidebar such that one of the farm animals can pass its head between said sidebar upper end and said first sidebar; and
    (C) pivots in a vertically oriented plane defined by said first sidebar and said second sidebar; and
  (4) said second sidebar being generally pivotally balanced on said pivot support shoulder whereby sufficient lateral pressure on either said second sidebar end repositions said second sidebar from a respective configuration to the other said configuration;
(g) a plurality of latching mechanisms, one for each of said stanchions; each of said latching mechanisms including:
  (1) a latch having a lock end for engaging and compressively retaining a respective second sidebar upper end in said first configuration thereof and a release end; and
  (2) a pair of hubs, each connected to a respective horizontal flange of a respective one of said pair of guide rails such that respective said sidebar upper end can pass between a respective pair of said guide rail vertical flanges; said pair of hubs connected intermediately to said latch such that said latch pivots about a generally horizontally oriented axis and such that said lock end is gravitationally urged downwardly to abut, in close proximity to respective said sidebar upper end, upper extremities of said horizontal flanges of said guide rails as respective said second sidebar assumes said first configuration; said latch axis being spaced further from said first sidebar than said second sidebar shoulder;
(h) a deactivator for said stanchions, which are arranged in said generally side-by-side relationship; each said deactivator having an activated configuration and a deactivated configuration; each said deactivator comprising:
  (1) a rod generally parallelly spaced relative to respective said guide rails;
  (2) a plurality of spacers adapted to mount said rod to said frame such that said rod is axially rotatable; and
  (3) a plurality of nubs secured to said rod such that said nubs are aligned colinearly; each of said nubs adapted to be:
    (A) rotated away from said guide rails whereat said activator assumes said activated configuration and whereat respective said lock ends gravitationally abut said guide rails; and
    (B) rotated toward said guide rails whereat said deactivator assumes said deactivated configuration and whereat said nubs interact with respective said release ends such that respective said sidebar upper ends can pass beneath respective said latches;
(i) a handle pivotally secured to said rod such that said handle can assume a downwardly depending configuration as said deactivator assumes said activated configuration and as said deactivator assumes said deactivated configuration; and
(j) a connector adapted to secure said handle in said downwardly depending configuration.

2. An apparatus for selectively automatically immobilizing a farm animal, comprising:
(a) a frame having a pair of parallely spaced apart guide rails;
(b) a stanchion comprising:
  (1) a first, generally vertically oriented sidebar;
  (2) a pivot support comprising a lower, generally vertical section and an upper section extending at an angle in a direction upwardly and away from said first sidebar, said pivot support including a pivot support shoulder;
  (3) a second sidebar having a sidebar upper end and a sidebar lower end; said second sidebar being pivotally connected to said pivot support shoulder and the upper end slidingly positioned between said guide rails such that said second sidebar:
    (A) has a first configuration wherein said second sidebar is generally parallel to said first sidebar and is spaced from said first sidebar such that a neck of one of the farm animals can be contained therebetween but the farm animal cannot pass its head therebetween; said sidebar upper end protrudes above said par of guide rails as said second sidebar approaches and assumes said first configuration;
    (B) has a second configuration wherein said lower end is spaced toward said first sidebar and said sidebar upper end is spaced away from said first sidebar such that one of the farm animals can pass its head between said sidebar upper end and said first sidebar; and
    (C) pivots in a vertically oriented plane defined by said first sidebar and said second sidebar; and
  (4) said sidebar being generally pivotally balanced on said pivot support shoulder whereby sufficient lateral pressure on either said second sidebar end repositions said second sidebar from a respective configuration to the other said configuration;

(c) a latching mechanism including:
  (1) a latch having a lock end for engaging and compressively retaining a respective second sidebar upper end in said first configuration thereof and a release end; and
  (2) a pair of hubs, each connected to a respective one of said pair of guide rails such that said sidebar upper end can pass therebetween; said pair of hubs connected intermediately to said latch such that said latch pivots about a generally horizontally oriented axis and such that said lock end is gravitationally urged downwardly to abut, in close proximity to said sidebar upper end, upper extremities of said guide rails as said second sidebar assumes said first configuration, said latch axis being spaced further from said first sidebar than said second sidebar shoulder;
(d) a deactivator having an activated configuration and a deactivated configuration, said deactivator comprising:
  (1) a rod generally parallely spaced relative to said guide rails;
  (2) a plurality of spacers adapted to mount said rod to said frame such that said rod is axially rotatable; and
  (3) a nub secured to said rod and adapted to be:
    (A) rotated away from said guide rails whereat said activator assumes said activated configuration and whereat said lock end gravitationally abuts said guide rails; and
    (B) rotated toward said guide rails whereat said deactivator assumes said deactivated configuration and whereat said nub interacts with said release end such that said sidebar upper end beneath said latch; and
(e) a handle secured to said rod.

3. A method for handling a farm animal, comprising the steps of:
(a) providing a frame having a pair of parallely spaced apart guide rails;
(b) providing a stanchion comprising:
  (1) a first, generally vertically oriented sidebar;
  (2) a pivot support comprising a lower, generally vertical section and an upper section extending at an angle in a direction upwardly and away from said first sidebar, said pivot support including a pivot support shoulder;
  (3) a second sidebar having a sidebar upper end and a sidebar lower end; said second sidebar being pivotally connected to said pivot support shoulder and the upper end slidingly positioned between said guide rails such that said second sidebar:
    (A) has a first configuration wherein said second sidebar is generally parallel to said first sidebar and is spaced from said first sidebar such that a neck of one of the farm animals can be contained therebetween but the farm animal cannot pass its head therebetween; said sidebar upper end protrudes above said pair of guide rails as said second sidebar approaches and assumes said first configuration;
    (B) has a second configuration wherein said lower end is spaced toward said first sidebar and said sidebar upper end is spaced away from said first sidebar such that one of the farm animals can pass its head between said sidebar upper end and said first sidebar; and
    (C) pivots in a vertically oriented plane defined by said first sidebar and said second sidebar; and
  (4) said sidebar being generally pivotally balanced on said pivot support shoulder whereby sufficient lateral pressure on either said second sidebar end repositions said second sidebar from a respective configuration to the other said configuration;
(c) providing a latching mechanism including:
  (1) a latch having a lock end for engaging and compressively retaining a respective second sidebar upper end in said first configuration thereof and a release end; and
  (2) a pair of hubs, each connected to a respective one of said pair of guide rails such that said sidebar upper end can pass therebetween; said pair of hubs connected intermediately to said latch such that said latch pivots about a generally horizontally oriented axis and such that said lock end is gravitationally urged downwardly to abut, in close proximity to said sidebar upper end, upper extremities of said guide rails as said second sidebar assumes said first configuration, said latch axis being spaced further from said first sidebar than said second sidebar shoulder;
(d) providing a deactivator having an activated configuration and a deactivated configuration, said deactivator comprising:
  (1) a rod generally parallely spaced relative to said guide rails;
  (2) a plurality of spacers adapted to mount said rod to said frame such that said rod is axially rotatable; and
  (3) a nub secured to said rod and adapted to be:
    (A) rotated away from said guide rails whereat said activator assumes said activated configuration and whereat said lock end gravitationally abuts said guide rails; and
    (B) rotated toward said guide rails whereat said deactivator assumes said deactivated configuration and whereat said nub interacts with said release end such that said sidebar upper end beneath said latch;
(e) providing a handle secured to said rod;
(f) allowing said second sidebar to assume said first configuration either gravitationally or otherwise;
(g) axially rotating said deactivator rod and automatically locking said second sidebar in said second configuration; and
(h) subsequently, axially rotating said deactivator rod such that said second sidebar can assume said first configuration wherein the farm animal can pass its head through said stanchion.

* * * * *